United States Patent [19]

Gauchet et al.

[11] Patent Number: 4,493,273
[45] Date of Patent: Jan. 15, 1985

[54] PLANTING ASSEMBLY

[75] Inventors: Yves M. A. Gauchet; Pierre G. Paillaud, both of Montereau, France

[73] Assignee: Nodet-Gougis, Montereau, France

[21] Appl. No.: 437,802

[22] Filed: Oct. 29, 1982

[30] Foreign Application Priority Data

Nov. 18, 1981 [FR] France .................. 81 21609

[51] Int. Cl.³ ............................ A01C 5/00; A01C 7/20
[52] U.S. Cl. ................................................ 111/86
[58] Field of Search .................. 111/34, 85, 86, 77,
111/54; 239/165–169; 403/157, 158, 145, 148,
149, 151; 406/173, 154, 38–44; 172/705, 271,
233, 234, 264, 265, 657, 643, 148, 710, 658;
193/9, 4; 280/485, 488, 489

[56] References Cited

U.S. PATENT DOCUMENTS

| 2,532,996 | 12/1950 | Clark et al. | 239/168 |
|---|---|---|---|
| 2,602,684 | 7/1952 | Pinke | 239/168 |
| 4,049,062 | 9/1977 | Rossmiller et al. | 403/53 |
| 4,170,804 | 10/1979 | Scotcher | 403/157 |

FOREIGN PATENT DOCUMENTS

| 1043173 | 11/1978 | Canada | 111/34 |
|---|---|---|---|
| 2214106 | 9/1973 | Fed. Rep. of Germany | 111/34 |
| 2233807 | 2/1975 | France | 111/77 |
| 287440 | 11/1971 | U.S.S.R. | 111/34 |
| 656573 | 4/1979 | U.S.S.R. | 111/34 |

Primary Examiner—James R. Feyrer
Attorney, Agent, or Firm—Frost & Jacobs

[57] ABSTRACT

A planting assembly is disclosed which comprises a tubular support arm for carrying a plowshare and for conveying seeds pneumatically. The front end of the support arm is pivotally mounted about a horizontal pivot pin perpendicular to the direction of displacement of the assembly. A spring acts in a vertical plane to exert a substantially constant force against the plowshare to drive it into the ground. The pivotal mounting of the support arm comprises a spring-loaded open-ended yoke for permitting rocking of the support arm in a horizontal plane when the horizontal couple exerted against the support arm exceeds a predetermined value. The front end of the tubular support arm is connected to a supply of air entrained seeds and the rear end to a cyclone separator separating the seeds which proceed through a conduit to the furrow cut by the plowshare, the main stream of entraining air being exhausted to the atmosphere.

2 Claims, 4 Drawing Figures

PLANTING ASSEMBLY

FIELD OF THE INVENTION

The present invention relates to a planting assembly comprising a tubular support arm for carrying a plowshare and pneumatically conveying seeds to be planted.

PRIOR ART

When sowing seeds with a planting assembly provided with a pneumatic conveying means, the operating steps are as follows: the plowshare breaks the ground, cutting a furrow, then the seeds are deposited pneumatically in the furrow by means of a conduit located immediately behind the plowshare. The furrow is then covered.

In addition to the regular forward movement, the plowshare and conduit together are subject to lateral or horizontal displacements caused by obstacles, such a rock in the ground, and vertical displacements owing to the ground not being horizontal though the seeds must be planted in the ground at a constant depth below the surface. Such horizontal and vertical movements are made possible by resilient means which return the plowshare to its normal path or position after clearing an obstacle and which ensure substantially constant plowshare penetration into the ground.

Generally speaking, the plowshare support arms are pivotally mounted about a horizontal axis perpendicular to the direction of movement of the planting assembly. Since it is associated with resilient means the pivotal mounting allows for variations in the level of the terrain to be followed, by applying pressure to the plowshare to force it against the ground.

Transverse reactions due to obstacles that the plowshare avoids by lateral displacement are taken up either by a displacement of the support bar about a vertical pivot provided with a return spring (see German DOS No. 2,025,039) or by the resilient deformation of the support arm by torsion and/or bending. In some supports constructed by the assignee of the present application this deformation is facilitated by the use of two branches or limps behaving like torsion springs. As a consequence the support arm accomodates very well to obstacles at the cost of some instability in its path of movement. In other cases the use of a tube connecting the pivot yoke to the plowshare ensures the resistance to forces with little deformation with the consequence being a lesser accommodation to large deformations and therefore a shorter service life.

It may appear logical to use such a tube in order to convey the seeds pneumatically to the furrows but this poses a problem, namely, in order to obatin a sufficiently tube sturdiness its diameter must be rather large and in this case the air flow rate must be high, whereby the planting of the seeds is disturbed by the air stream. If the tube is thinner, its rigidity, notably in torsion, is inadequate and this results in the drawbacks of the instability of the path of movement of the planting assembly mentioned above, coupled with a limited service life.

OBJECT AND SUMMARY OF THE INVENTION

An object of the present invention is to continue to use the tubular support arm as a conduit while obtaining good performance with respect to obstacle and good stability of the path of movement of the planting assembly.

According to the invention there is provided a planting assembly comprising a tubular support arm for a plowshare and for pneumatically conveying seeds to be planted. The plowshare is carried at the rear end of the support arm. Means are provided to pivotally mount the front end of the support arm on the frame of the planting assembly including a horizontal pivot pin extending perpendicular to the direction of movement of the planting assembly. Resilient return means act in a vertical plane to exert a substantially constant force against the plowshare tending to drive the plowshare into the ground. The improvement comprises the means for pivotally mounting the front end of the support arm, such means comprising a spring-loaded open-ended yoke for permitting rocking of the support arm in a horizontal plane when the support arm is subjected to a horizontal couple exceeding a predetermined value. The interior of the front end of the support arm is connected to means for supplying compressed air and seeds. A cyclone separator for separating the seeds from the main stream of entraining air is connected to the interior of the rear end of the support arm, the lower end of the cyclone separator being part of a conduit for planting seeds in a furrow cut by the plowshare.

An example of a spring-loaded open-ended yoke will be described below. The use of such a yoke has the following advantages:

absence of substantial deformation until the couple or moment produced by the product of the spring force and half the width of the yoke is reached. This guarantees good stability of the path of movement of the seeds planting assembly;

considerable tranverse displacement of the end of the plowshare when the force continues to increase over the aforesaid couple, thereby permitting sizable obstacles to be avoided without any breaks.

The use of the cyclone separator at the top of the plowshare enables a high air flow rate to be employed without disturbing the planting of the seeds in the ground. It will be observed that the use of a cyclone separator as a planting device was previously disclosed in French printed patent application No. 2,233,804 in the name of the assignee of the present application, but in this patent publication the cyclone separator is supplied through a flexible hose which is not intended to function as a plowshare support arm.

The invention will now be described in greater detail by way of a non-limiting embodiment of a planting device illustrated in the accompanying drawings.

DESCRIPTION OF THE PREFERRED EMBODIMENT

Figure 1:
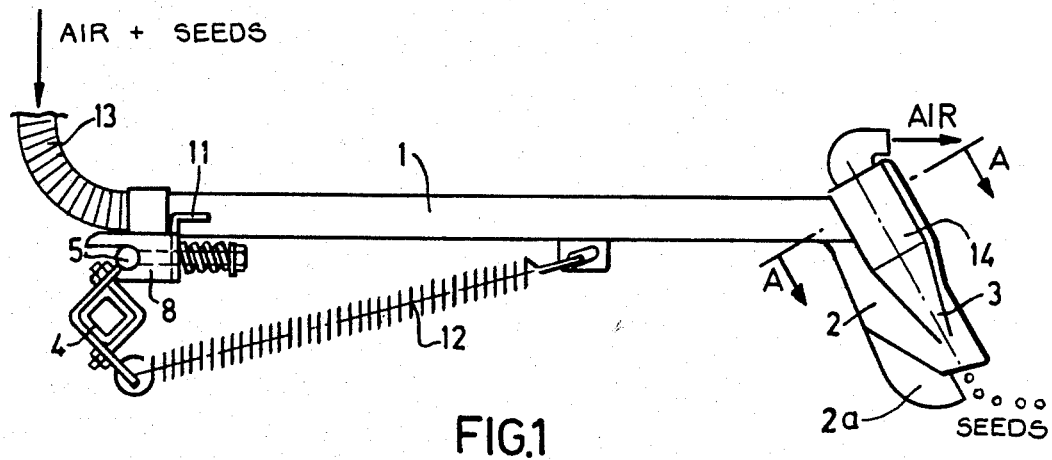
FIG. 1 shows a schematic side elevational view of a support arm and the members connected thereto.
Figure 2:
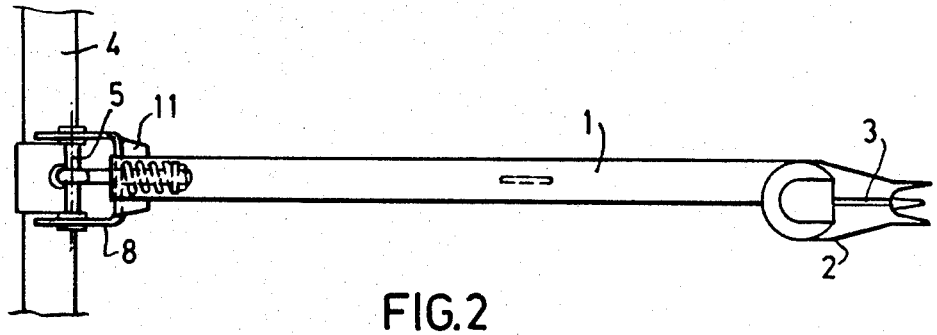
FIG. 2 shows a top plan view of the support arm of FIG. 1.
Figure 3:
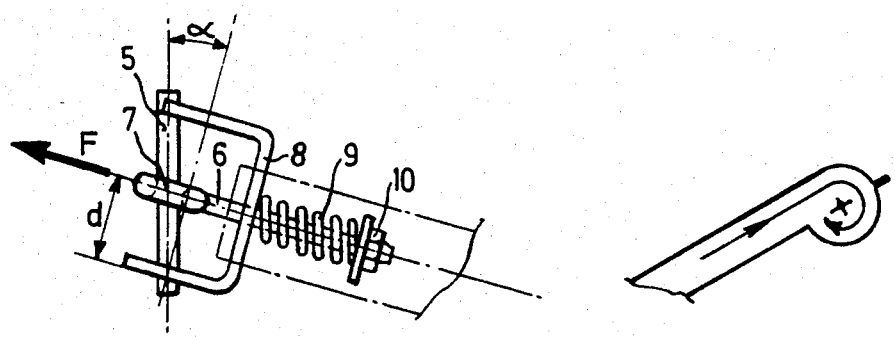
FIG. 3 shows an enlarged detail view of the pivotal mounting for the support arm, (shown by broken lines) in an oblique position.
Figure 4:
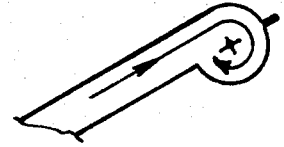
FIG. 4 shows a schematic sectional view taken along line A—A in FIG. 1.

The planting assembly illustrated in the drawings comprising a tubular support arm 1 which carries at its rear end (to the right in FIGS. 1 and 2) a support member 2 for supporting a plowshare 2a and a conduit 3 for planting seeds in a furrow. The support arm 1 is carried on a cross member 4 fixed to the frame of the planting assembly by means of a pivot mounting comprising a horizontal pivot pin 5 extending perpendicular to the direction of displacement of the planting assembly and fixed relative to the cross member 4. A rod 6 is terminated at one end by an eye 7 through which extends pivot pin 5 with clearance sufficient to permit considerable rocking, such as 10°–15°, in the horizontal plane. An open ended yoke 8 of U-shaped configuration in the horizontal plane slides on the rod 6. The ends of the legs of the U-shaped yoke are provided with U-shaped slots defining openings corresponding to the diameter of pivot pin 5. A coil spring 9 is received on rod 6 and biases the yoke 8 forwardly. The bias exerted by coil spring 9 is adjustable by means of nut 10 in threaded engagement with the threaded end of rod 6. The yoke 8 further comprises two brackets 11 welded to the support arm 1, thereby fixing the yoke 8 on the latter.

The operation of the pivotal mounting with the open-ended yoke is as follows: the spring 9 exerts a force F against the yoke 8 which tends to maintain it in engagement with the pivot pin 5, the couple holding the yoke in position being equal to the product of the force F times half the distance d between the legs of the yoke 8.

As long as the moment produced by obstacles or other irregularities in the ground is less than the product F×d, the support arm 1 remains perpendicular to the pivot pin 5 and the plowshare 2a cuts a straight furrow. If, on the contrary, a larger obstacle is encountered, the couple F×d is exceeded and the support arm 1 pivots through an angle a. The return couple is exerted by the spring 9 and by the reaction of the ground with the front face of the plowshare 2a during displacement.

Uniform pressure of the plowshare 2a against the ground is ensured in the conventional manner by spring 12 exerting traction in the vertical plane and attached at one end to the support arm 1 and at the other end to the cross member 4.

The seeds and entraining air are supplied at the front end of the tubular support arm 1 via a flexible hose 13. At the opposite or rear end of the tubular support arm 1 is provided a cyclone separator 14 comprising an upper outlet for air and a lower outlet for seeds which fall from the cyclone 14 through a conduit 3 to the ground.

Obviously the invention is not intended to be limited to the embodiment which has just been described. It is possible, for example, to replace the mechanical springs 9 and 12 with hydraulic or pneumatic "springs" or provide the planting assembly with known means for distributing the seeds.

What is claimed is:

1. In a planting assembly having a frame fixedly mounting a cross-member carrying a horizontal pivot pin entending perpendicular to the direction of movement of the planting assembly, a tubular support arm for a plowshare and for pneumatically conveying seeds to be planted pivotally mounted at its front end to said horizontal pivot pin, a plowshare carried at the rear end of said support arm, the interior of the front end of said support arm being connected to means for supplying a stream of entraining compressed air and seeds, the interior of the rear end of said support arm being connected to a cyclone separator for separating the seeds from the stream of entraining compressed air, the cyclone separator having a lower end which is part of a conduit for planting seeds in a furrow cut by the plowshare, and resilient return means acting in a vertical plane to exert a substantially constant force against the plowshare to drive it into the ground, the improvement comprising:
   a U-shaped yoke fixedly secured to the front end of said support arm, said yoke having a central portion and a pair of open-ended slotted legs positioned to engage said horizontal pivot pin to permit pivoting movement of said support arm in a vertical plane and permit lateral rocking of the support arm in a horizontal plane,
   a rod slidably received in the central portion of said yoke, said rod terminating at one end in an eye surrounding said horizontal pivot pin with a clearance sufficient to permit lateral rocking of said support arm,
   a coil spring surrounding said rod and extending between the central portion of said yoke and a stop at the opposite end of said rod, said coil spring acting to bias the slotted legs of said yoke into engagement with said horizontal pivot pin under a predetermined force, said coil spring permitting lateral rocking movement of said yoke relative to said horizontal pivot pin when said support arm is subjected to a lateral force exceeding the predetermined force of said coil spring.

2. The planting assembly claimed in claim 1 wherein the opposite end of said rod is threaded and provided with a nut forming the stop for said spring, said nut being adjustable to vary the predetermined biasing force exerted by said spring.

* * * * *